Sept. 12, 1950 F. KRIKORIAN 2,522,181
NONSCORING BRAKE ADJUSTER
Filed Oct. 23, 1946 2 Sheets-Sheet 1
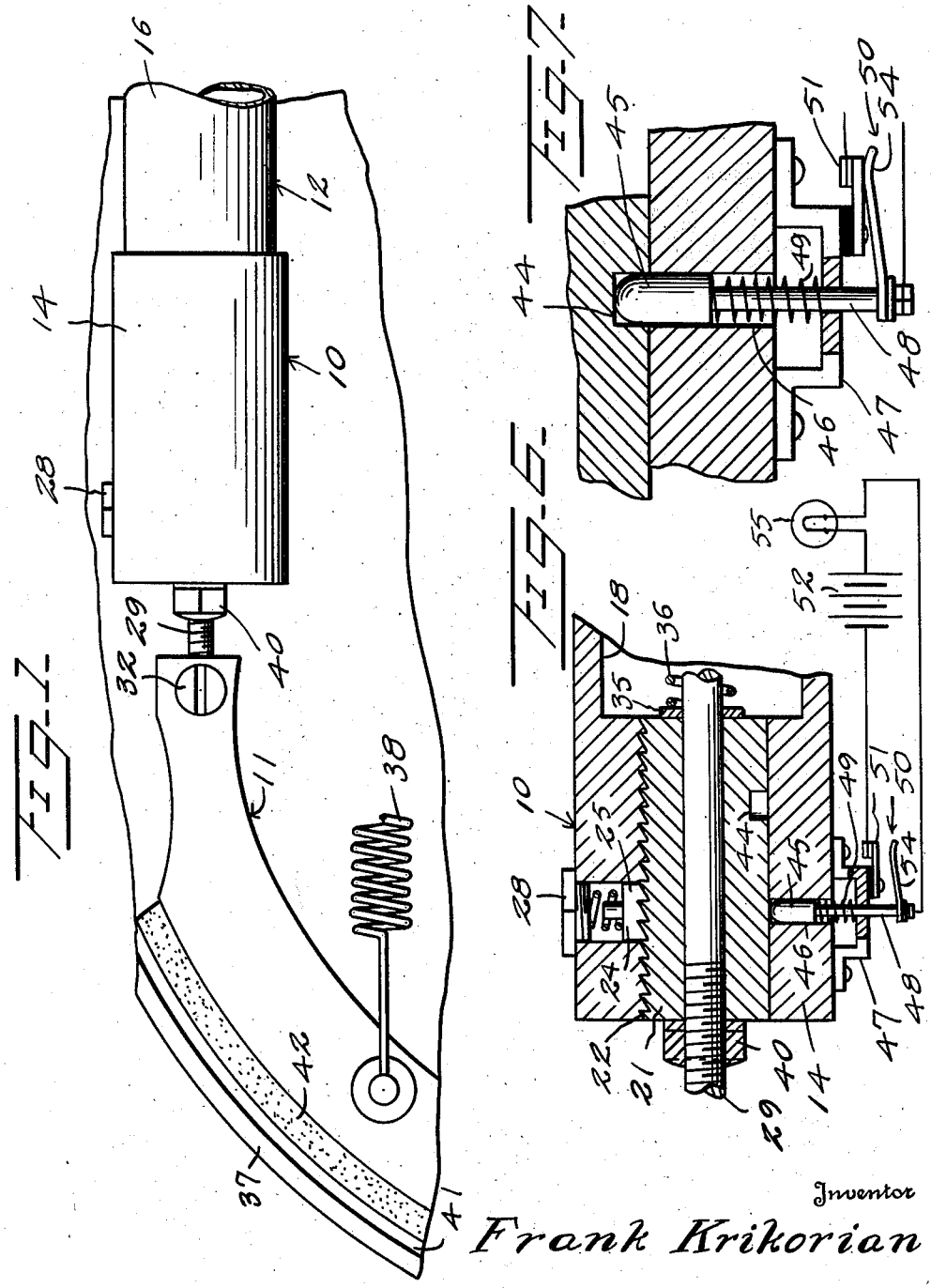
Inventor
Frank Krikorian
By
Kimmel & Crowell Attorneys

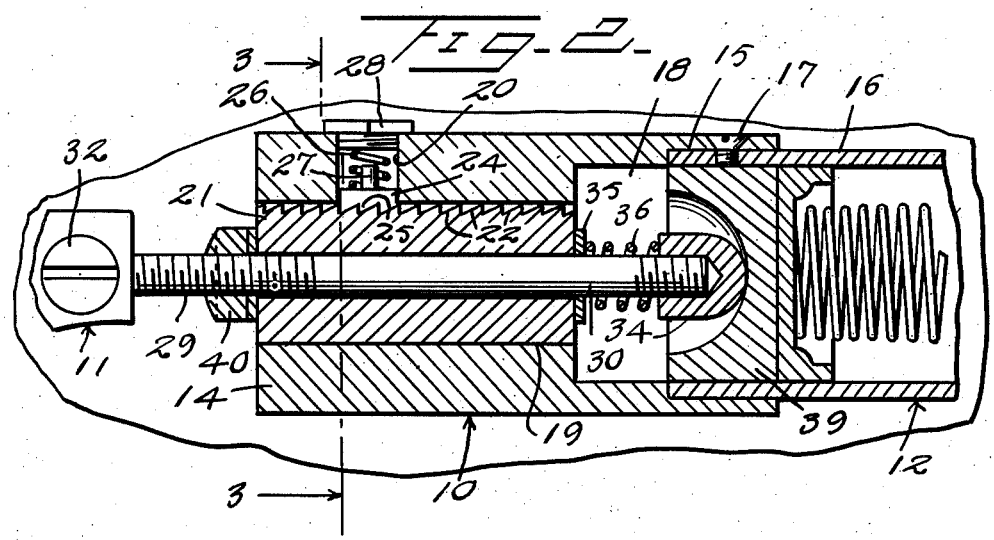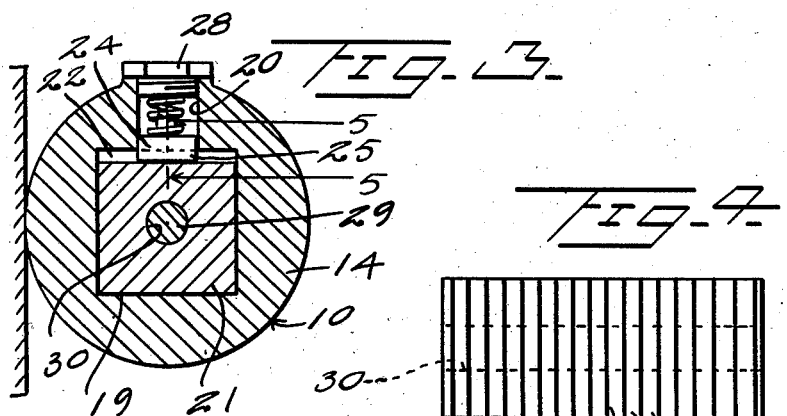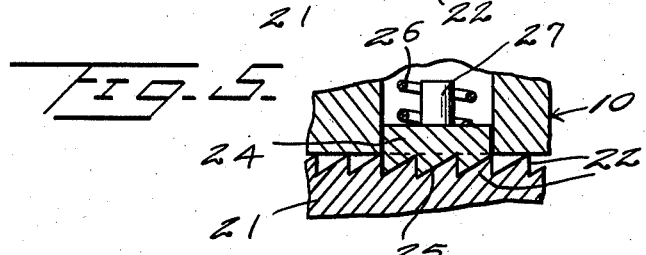

Patented Sept. 12, 1950

2,522,181

UNITED STATES PATENT OFFICE 2,522,181

NONSCORING BRAKE ADJUSTER

Frank Krikorian, Lowell, Mass.

Application October 23, 1946, Serial No. 705,046

1 Claim. (Cl. 188—79.5)

This invention relates to improvements in brake adjusting devices, and more particularly to a brake adjuster for automatically adjusting the brake clearance during the use of the brakes.

It is an object of this invention to provide a brake adjuster of the kind to be more specifically described hereinafter which comprises a pawl and ratchet between the brake operating mechanism and the brake shoe for maintaining the clearance between the brake lining and the brake drum between certain predetermined limits.

Another object of this invention is to provide a brake adjuster of this kind which is so constructed and arranged that the brake clearance will be held between certain specified limits despite the wear on the brake lining, and which is provided with a spring-pressed stop arrangement for stopping the adjusting mechanism when the brake lining is completely worn out, thus preventing the scoring of the brake drums by the rivets which hold the lining to the shoes.

Still another object of this invention is to provide a brake adjuster of this kind which may be readily adjusted for use on any type of automobile or truck whether using hydraulic or mechanical brakes.

A further object of this invention is to provide an improved brake adjuster which is constructed with a minimum number of moving parts while providing a highly efficient device of this kind, thereby providing for a minimum of maintenance difficulties and a minimum amount of labor for repairing such maintenance problems as might arise.

A still further object of this invention is to provide a ratchet type of brake adjuster which is applicable to all types and models of automobiles and trucks which may readily be combined with the brake as an attachment or as a part of the original assembly.

With the above and other objects in view, my invention consists in the arrangement, combination and details of construction disclosed in the drawings and specification, and then more particularly pointed out in the appended claim.

In the drawings:

Figure 1 is a side elevation of my brake adjuster on a brake assembly, the brake drum and shoe being broken away, Figure 2 is a vertical longitudinal section thereof, Figure 3 is a transverse section taken on the line 3—3 of Figure 2, Figure 4 is a top plan view of the ratchet removed from the assembly, Figure 5 is a vertical section taken on the line 5—5 of Figure 3, Figure 6 is a vertical longitudinal section of a modified form of brake adjuster, and Figure 7 is an enlarged fragmentary section of the brake adjuster of Figure 6, the lock being shown in locking position.

Referring to the drawings, the numeral 10 designates generally a brake adjuster constructed according to an embodiment of my invention. This brake adjuster 10 is adapted to be fixed on a brake between the brake shoe 11 and the brake shoe operating means 12.

The brake adjuster 10 consists of a housing or sleeve 14 which is fixed relative to the brake. The housing or sleeve 14 may be formed at one end with an annular recess 15 for slidably engaging over the end of a brake cylinder 16, the fixed end of the cylinder being removed, and is fixed thereon by a set screw 17 engaging through the wall of the sleeve 14 and cylinder 16. The sleeve 14 is further formed with a deep recess 18 at the same end as the recess 15 outwardly of the cylinder 16. A square opening 19 is formed in the center of the sleeve 14 longitudinally thereof and communicates at its inner end with the recess 18. Near the outer end of the housing 14 there is provided a bore 20 at right angles to the axis of the cylinder 14 through one wall thereof which communicates with the opening 19 from outside of the cylinder.

A rectangular block 21 slidably engages in the opening 19 and is formed on its upper side with a series of transverse rearwardly inclined serrations or notches 22 which form a ratchet having inwardly and upwardly inclined teeth 22. The block 21 alone is freely slidable in the opening 19 but is limited in its movement therein by a pawl 24 having downwardly and outwardly inclined teeth 25 engageable in the teeth or notches 22 in block 21, whereby the block 21 may slide only outwardly of the sleeve 14. The pawl 24 is slidably housed in the opening or bore 20 in the cylinder 14. The pawl 24 is constantly urged into engagement with the ratchet 21 by a spring 26 which engages about the upstanding lug 27 on the pawl 24 and bears against the upper side of the pawl 24. The upper end of the spring 26 bears against the lower end of a plug screw 28 threadably engaged in the upper end of the bore 20.

A connecting rod 29 extends through the block 21 and is slidable therein in the bore 30 through block 21. The rod 29 is connected at its outer end to the free end of the brake shoe 11 by a pivot bolt 32. The inner end of the bolt 29 is provided with a rounded cap or bearing surface 34 within the recess 18 of the housing 14 and is spaced inwardly from the inner rear wall of the block 21. A washer 35 is positioned about the rod 29 between the block 21 and cap 34 and a coiled spring 36 between the washer 35 and cap 34 constantly urges the rod 29 inwardly and the brake shoe 11 out of engagement with the brake drum 37. This spring 36 is in addition to the conventional spring 38 fixed at one end to the brake shoe 11 and at its other end to the brake itself.

The cap 34 is adapted to bear against the outer end of the piston 39 in the brake cylinder 12. A nut 40 on the outer end of the rod 29 is adapted to bear against the outer end of the block 21 to limit the inward movement of the rod 29.

In the use and operation of the brake adjuster 10, on installation the brake clearance 41 is determined from the manufacturer and set by moving the nut 40 on the rod 29 until the clearance between the brake drum 37 and brake lining 42 is obtained. Then in the use of the brake, when the brake pedal in the machine is depressed, the piston 39 is caused to move outwardly. Movement of the piston 39 presses the rod 29 outwardly to engage the lining 42 with the drum 37. After initial movement of the rod 29 outwardly when the spring 36 is completely compressed and the brake is not yet set, further movement of the rod 29 causes the block 21 to slide outwardly with the rod 29 until the brake is set. Under normal conditions, the sliding of the block 21 is less than the length of one tooth 22 whereby when the brake pedal is released the rod 29 and block 21 are returned to their original position by springs 38 and 36. As the brake lining 42 wears and the clearance 41 nears the extreme limit, the movement of the block 21 will reach the length of one of the teeth 22 and cause the block 21 to be held outwardly at the next tooth 22 so that the rod 29 when being returned to starting position will return a distance shorter by the length of the tooth 22 so that the clearance 42 is again brought to a minimum distance. The block 21 is continually stepped outwardly upon wearing of the lining 42 and is held against movement inwardly by the pawl 24 engaging the ratchet teeth 22. When the lining 42 is worn past safe limits, the lining may be replaced in a conventional manner and the brake adjuster reset by removing the screw plug 28 and allowing the block 21 to slide inwardly to the first clearance adjustment desired, which will be a minimum.

The spacing of each tooth 22 will be less than the difference between the maximum and minimum brake clearance so that the clearance will always be within safe limits.

With the use of the brake adjuster 10 as described above, the block 21 will be moved outwardly to take up the wear on the lining 42 irrespective of the thickness of the lining, and when used as described above will keep adjusting the brake clearance until the rivets which hold the brake lining on are rubbing the drum 37 which causes scoring thereof.

In order to prevent such scoring of the drums 37 and to stop the block 21 in its outward adjusting movement, there is provided a notch 44 on the lower side of the block 21 transversely thereof, and a pin 45 carried by the housing 14 is adapted to engage in the notch 44 and bore 46 in the housing 14. The pin 45 is slidably carried in the bore 46 in the housing 14, and normally engages the lower flat surface of the block 21. A U-shaped bracket 47 is fixed to the housing 14 over the bore 46 and pin 45, the pin 45 being formed with a reduced diameter outer extending end 48, which extends through the bracket 47. A spring 49 about the reduced end 48 of the pin 45 within the bracket 47 presses pin 45 inwardly of the housing 14. In the initial setting and adjusting of the brake adjuster 10, the block 21 is pushed inwardly so that the notch 44 is a distance inwardly of the pin 45 equal to the maximum total amount of wear permissible on the lining 42, so that as the lining 42 becomes worn and the shoe 11 is adjusted to compensate for this wear, when the lining is worn to a point just before the rivets will score the brake drum 37, the pin 45 will engage in the notch 44 to prevent any further outward adjustment of the block 21 whereby the drums will be saved from scoring by the rivets which hold the lining 42 on the brake shoe 11.

When the lining 42 has become entirely worn and the pin 45 has engaged in the slot 44, this condition may be indicated to the operator of the vehicle by providing a switch 50 operated by the pin 45, so the operator will be warned to have the brakes relined at the earliest possible time. The switch 50 includes a fixed contact 51 on the bracket 47, which may be connected by suitable wiring to the battery 52, and a moving contact 54 fixed in the pin 45, which is connected to a light bulb 55 on the dashboard of the vehicle or other suitable alarm.

When the pin 45 is in its outer position as the adjuster 10 is in position for use as such, the switch 50 is open, and when the pin slides into the notch 44 the switch 50 is closed, as shown in Figure 7, completing the electrical circuit to the alarm or bulb 55.

I do not mean to confine myself to the exact details of construction herein disclosed, but claim all variations falling within the purview of the appended claim.

What I claim is:

A brake adjusting device of the kind described comprising a housing, a ratchet member slidable in said housing, a spring-pressed pawl engaging said ratchet member limiting the sliding thereof to one direction, a rod slidable in said ratchet member and operatively connected to a brake shoe, an abutment member on said rod engageable with one end of said ratchet member for sliding said ratchet member against said pawl, an operator for said brake shoe operatively connected to said rod, a lost motion connection including a compression spring between said rod and said ratchet member for sliding said member after initial movement of said rod upon complete compression of said spring, said ratchet member formed with a recess along the length thereof, a spring pressed locking pin carried by said housing engageable in said recess for locking said ratchet member after a determined sliding movement thereof in said housing, a fixed switch contact member on said housing, and a switch contact member on said locking pin engageable with said fixed contact for closing an electric alarm circuit when said pin engages in said recess.

FRANK KRIKORIAN.

REFERENCES CITED

The following references are of record in the file of this patent:

UNITED STATES PATENTS

| Number | Name | Date |
|---|---|---|
| Re. 18,723 | Hirschler | Jan. 31, 1933 |
| 2,002,139 | Des Rosiers | May 21, 1935 |
| 2,117,288 | Blucher | May 17, 1938 |
| 2,127,801 | Goepfrich | Aug. 23, 1938 |
| 2,140,971 | Roberts | Dec. 20, 1938 |
| 2,404,326 | Taylor | July 16, 1946 |